(12) United States Patent
Aisenbrey

(10) Patent No.: US 7,549,521 B2
(45) Date of Patent: Jun. 23, 2009

(54) LOW COST ELECTRICAL POWER CONNECTIVITY FOR RAILWAY SYSTEMS MANUFACTURED FROM CONDUCTIVE LOADED RESIN-BASED MATERIALS

(75) Inventor: Thomas Aisenbrey, Littleton, CO (US)

(73) Assignee: Integral Technologies, Inc., Bellingham, WA (US)

( * ) Notice: Subject to any disclaimer, the term of this patent is extended or adjusted under 35 U.S.C. 154(b) by 575 days.

(21) Appl. No.: 11/284,005

(22) Filed: Nov. 21, 2005

(65) Prior Publication Data
US 2006/0071862 A1 Apr. 6, 2006

Related U.S. Application Data

(63) Continuation-in-part of application No. 10/877,092, filed on Jun. 25, 2004, now abandoned, which is a continuation of application No. 10/309,429, filed on Dec. 4, 2002, now Pat. No. 6,870,516, which is a continuation-in-part of application No. 10/075,778, filed on Feb. 14, 2002, now Pat. No. 6,741,221.

(60) Provisional application No. 60/629,261, filed on Nov. 19, 2004, provisional application No. 60/317,808, filed on Sep. 7, 2001, provisional application No. 60/269,414, filed on Feb. 16, 2001, provisional application No. 60/268,822, filed on Feb. 15, 2001.

(51) Int. Cl.
B60M 1/00 (2006.01)

(52) U.S. Cl. .............................. 191/29 DM; 191/22 R; 191/33 PM; 174/126.2

(58) Field of Classification Search ............... 191/45 R, 191/49, 50, 52, 59, 59.1, 33 R, 22 R, 29 DM, 191/33 PM, 22 DM; 174/68.1, 110 R, 119 R, 174/126.1, 126.2, 128.1
See application file for complete search history.

(56) References Cited

U.S. PATENT DOCUMENTS

| | | | | |
|---|---|---|---|---|
| 2,067,405 A | * | 1/1937 | Mayne | 57/7 |
| 5,218,171 A | * | 6/1993 | Aldissi | 174/128.1 |
| 6,557,476 B2 | * | 5/2003 | Batisse | 104/289 |

* cited by examiner

Primary Examiner—Mark T Le
(74) Attorney, Agent, or Firm—Douglas Schnabel

(57) ABSTRACT

Electrical connectivity devices for railway systems are formed of a conductive loaded resin-based material. The conductive loaded resin-based material comprises micron conductive powder(s), conductive fiber(s), or a combination of conductive powder and conductive fibers in a base resin host. The percentage by weight of the conductive powder(s), conductive fiber(s), or a combination thereof is between about 20% and 50% of the weight of the conductive loaded resin-based material. The micron conductive powders are metals or conductive non-metals or metal plated non-metals. The micron conductive fibers may be metal fiber or metal plated fiber. Further, the metal plated fiber may be formed by plating metal onto a metal fiber or by plating metal onto a non-metal fiber. Any platable fiber may be used as the core for a non-metal fiber. Superconductor metals may also be used as micron conductive fibers and/or as metal plating onto fibers in the present invention.

27 Claims, 8 Drawing Sheets

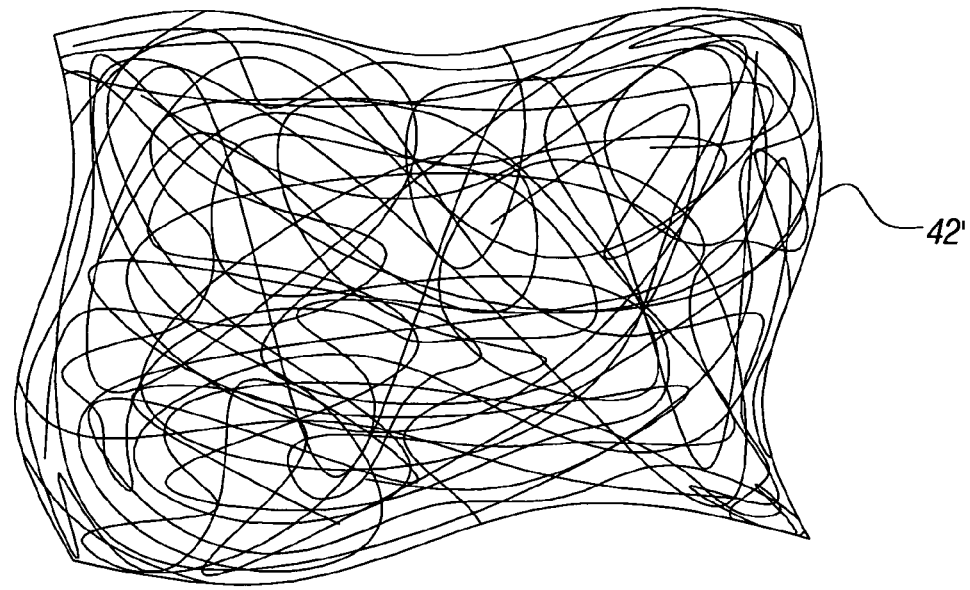
FIG. 5b
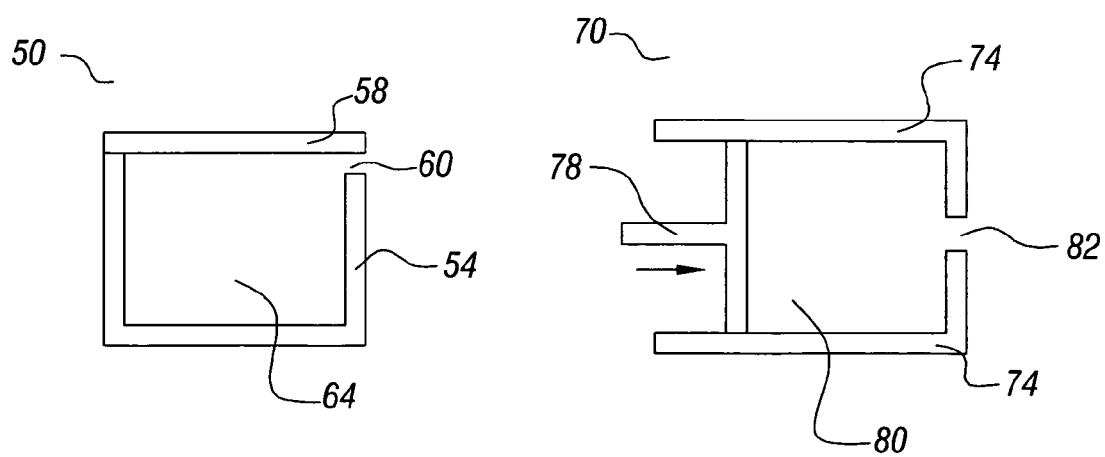
FIG. 6a
FIG. 6b

US 7,549,521 B2

LOW COST ELECTRICAL POWER CONNECTIVITY FOR RAILWAY SYSTEMS MANUFACTURED FROM CONDUCTIVE LOADED RESIN-BASED MATERIALS

RELATED PATENT APPLICATIONS

This Patent Application claims priority to the U.S. Provisional Patent Application 60/629,261 filed on Nov. 19. 2005, which is herein incorporated by reference in its entirety.

This Patent Application is a Continuation-in-Part of INT01-002CIPC, filed as U.S. patent application Ser. No. 10/877,092, filed on Jun. 25, 2004, now abandoned, which is a Continuation of INT01-002CIP, filed as U.S. patent application Ser. No. 10/309,429, filed on Dec. 4, 2002, now issued as U.S. Pat. No. 6,870,516, also incorporated by reference in its entirety, which is a Continuation-in-Part application of docket number INT01-002, filed as U.S. patent application Ser. No. 10/075,778, filed on Feb. 14, 2002, now issued as U.S. Pat. No. 6,741,221, which claimed priority to U.S. Provisional Patent Applications Ser. No. 60/317,808, filed on Sep. 7, 2001, Ser. No. 60/269,414, filed on Feb. 16, 2001, and Ser. No. 60/268,822, filed on Feb. 15, 2001, all of which are incorporated by reference in their entirety.

BACKGROUND OF THE INVENTION (1) Field of the Invention

This invention relates to railway systems and, more particularly, to electrical connectivity for railway systems molded of conductive loaded resin-based materials comprising micron conductive powders, micron conductive fibers, or a combination thereof, substantially homogenized within a base resin when molded. This manufacturing process yields a conductive part or material usable within the EMF, thermal, acoustic, or electronic spectrum(s).

(2) Description of the Prior Art

Mass transit railway systems are frequently powered by electric motors. In these systems, electrical power is generated from a power station and is then supplied to the train through overhead wires or through power rails on the track. This electrical power may be direct current (DC) or alternating current (AC). An electric motor, or set of motors, converts the supplied electrical power into mechanical torque which is applied to the wheels of the train. The electrical connectivity between the train and the railway power supply typically comprises several components. Among these components are an overhead wiring network, often called a catenary, a train-to-overhead wiring contacting device, typically called a pantograph, a power and/or grounding rail, typically called the third rail, and a train-to-rail contacting device, typically called a shoe. In a typical electric railway system, the above components are constructed from metals such as steel, copper, or aluminum. The prior art systems provide circuit conductivity but include several disadvantages. First, metal wires, rails, and contact devices are susceptible to oxidation and other corrosion due to exposure to weather or due to electrolytic events. This oxidation and corrosion structurally weakens these devices and substantially increases electrical resistance, power loss, and maintenance costs. Second, the weight of metal wires, rails, and contact devices create several concerns. Heavy overhead wires require heavy support poles that increase railway construction costs. Similarly, heavy metal conductive rails require heavier support bridges and overpasses. Heavy contact devices, such as metal pantographs and shoes, directly increase the weight of the train and result in reduced energy efficiency and/or slower operating speeds. It is an important object of the present invention to provide railway power systems comprising overhead wiring, power rails, and/or contact devices exhibiting improved oxidation/corrosion performance and reduced weight among other advantages.

Several prior art inventions relate to railway systems. U.S. Pat. No. 4,363,940 to Bertelsbeck teaches an electrically driven rail or track bound vehicle with a height and width adjustable current collector for gathering the power supply from an overhead wire. U.S. Pat. No. 5,584,369 to Makino et al teaches a high speed low noise current collector for a railway vehicle that utilizes aluminum as the conductive element for electrical contact to the overhead wire. U.S. Pat. No. 4,900,992 to Sekizawa et al teaches an apparatus and method for controlling an electric car that utilizes a third inner rail to supply the power for the linear induction motor driven subway train.

SUMMARY OF THE INVENTION

A principal object of the present invention is to provide effective electrical power connectivity for an electrical railway system.

A further object of the present invention is to provide electrical railway power connectivity devices comprising a conductive loaded, resin-based material.

A further object of the present invention is to provide overhead electrical conductors for an electrical railway system comprising conductive loaded resin-based material.

A further object of the present invention is to provide power rails for an electrical railway system comprising conductive loaded resin-based material.

A further object of the present invention is to provide pantographs for an electrical railway system comprising conductive loaded resin-based material.

A further object of the present invention is to provide a method to form electrical railway power connectivity devices comprising conductive loaded resin-based material.

A further object of the present invention is to provide an electrical railway power connectivity device molded of conductive loaded resin-based materials.

A yet further object of the present invention is to provide an electrical railway power connectivity device molded of conductive loaded resin-based material where the electrical or thermal characteristics can be altered or the visual characteristics can be altered by forming a metal layer over the conductive loaded resin-based material.

In accordance with the objects of this invention, an electric circuit apparatus is achieved. The apparatus comprises an electric motor fixably mounted in a train. An electric power source is physically separated from the train. An electrical conductor electrically connects the motor to the power source. The conductor comprises a conductive loaded, resin-based material comprising conductive materials in a base resin host.

Also in accordance with the objects of this invention, an electric circuit apparatus is achieved. The apparatus comprises an electric motor fixably mounted in a train. An electric power source is physically separated from the train. An electrical conductor electrically connects the motor to the power source. The conductor comprises a conductive loaded, resin-based material comprising micron conductive fiber in a base resin host.

Also in accordance with the objects of this invention, a method to form an electric circuit apparatus is achieved. The method comprises providing an electric motor fixably mounted in a train. An electric power source is physically separated from the train. A conductive loaded, resin-based material comprising conductive materials in a resin-based host is provided. The conductive loaded, resin-based material is molded into an electrical conductor. The electrical conductor is placed to electrically connect the motor to the power source.

BRIEF DESCRIPTION OF THE DRAWINGS

In the accompanying drawings forming a material part of this description, there is shown:

FIGS. 5a and 5b illustrate a fourth preferred embodiment wherein conductive fabric-like materials are formed from the conductive loaded resin-based material.

FIGS. 6a and 6b illustrate, in simplified schematic form, an injection molding apparatus and an extrusion molding apparatus that may be used to mold circuit conductors of a conductive loaded resin-based material.

DESCRIPTION OF THE PREFERRED EMBODIMENTS

Figure 1:
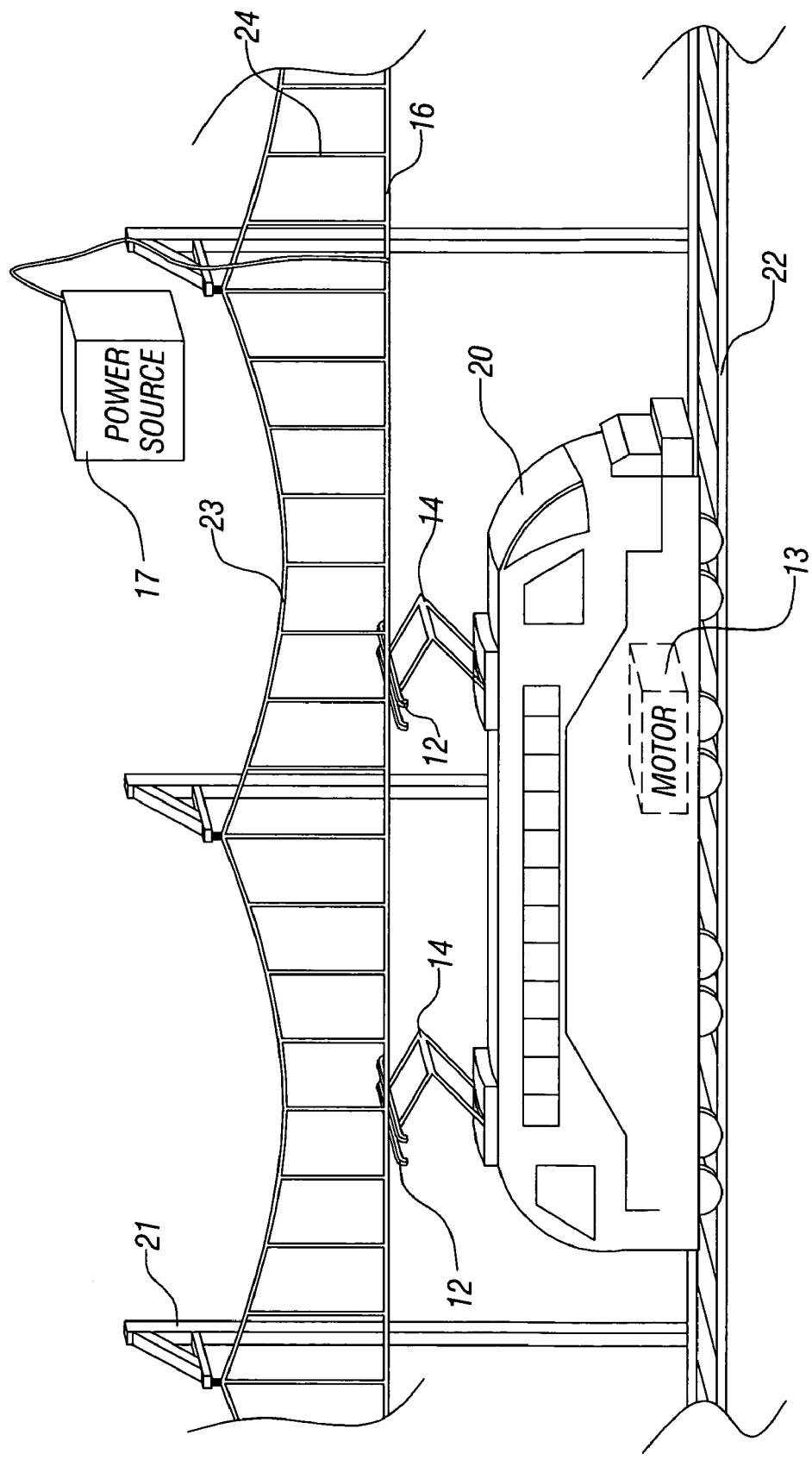
FIG. 1 illustrates a first preferred embodiment of the present invention showing a passenger train and railway system with electrical connectivity comprising a conductive loaded resin-based material.

This invention relates to electrical connectivity for railway systems molded of conductive loaded resin-based materials comprising micron conductive powders, micron conductive fibers, or a combination thereof, substantially homogenized within a base resin when molded.

The conductive loaded resin-based materials of the invention are base resins loaded with conductive materials, which then makes any base resin a conductor rather than an insulator. The resins provide the structural integrity to the molded part. The micron conductive fibers, micron conductive powders, or a combination thereof, are substantially homogenized within the resin during the molding process, providing the electrical, thermal, and/or acoustical continuity.

The conductive loaded resin-based materials can be molded, extruded or the like to provide almost any desired shape or size. The molded conductive loaded resin-based materials can also be cut, stamped, or vacuumed formed from an injection molded or extruded sheet or bar stock, over-molded, laminated, milled or the like to provide the desired shape and size. The thermal or electrical conductivity characteristics of electrical connectivity for railway systems fabricated using conductive loaded resin-based materials depend on the composition of the conductive loaded resin-based materials, of which the loading or doping parameters can be adjusted, to aid in achieving the desired structural, electrical or other physical characteristics of the material. The selected materials used to fabricate the electrical connectivity for railway systems are substantially homogenized together using molding techniques and or methods such as injection molding, over-molding, insert molding, thermoset, protrusion, extrusion, calendaring, or the like. Characteristics related to 2D, 3D, 4D, and 5D designs, molding and electrical characteristics, include the physical and electrical advantages that can be achieved during the molding process of the actual parts and the polymer physics associated within the conductive networks within the molded part(s) or formed material(s).

In the conductive loaded resin-based material, electrons travel from point to point when under stress, following the path of least resistance. Most resin-based materials are insulators and represent a high resistance to electron passage. The doping of the conductive loading into the resin-based material alters the inherent resistance of the polymers. At a threshold concentration of conductive loading, the resistance through the combined mass is lowered enough to allow electron movement. Speed of electron movement depends on conductive loading concentration, that is, the separation between the conductive loading particles. Increasing conductive loading content reduces interparticle separation distance, and, at a critical distance known as the percolation point, resistance decreases dramatically and electrons move rapidly.

Resistivity is a material property that depends on the atomic bonding and on the microstructure of the material. The atomic microstructure material properties within the conductive loaded resin-based material are altered when molded into a structure. A substantially homogenized conductive microstructure of delocalized valance electrons is created. This microstructure provides sufficient charge carriers within the molded matrix structure. As a result, a low density, low resistivity, lightweight, durable, resin based polymer microstructure material is achieved. This material exhibits conductivity comparable to that of highly conductive metals such as silver, copper or aluminum, while maintaining the superior structural characteristics found in many plastics and rubbers or other structural resin based materials.

The use of conductive loaded resin-based materials in the fabrication of connectivity significantly lowers the cost of materials and the design and manufacturing processes used to hold ease of close tolerances, by forming these materials into desired shapes and sizes. The electrical connectivity for railway systems can be manufactured into infinite shapes and sizes using conventional forming methods such as injection molding, over-molding, extrusion, calendaring, compression molding, thermoset molding, or the like. The conductive loaded resin-based materials, when molded, typically but not exclusively produce a desirable usable range of resistivity from less than about 5 to more than about 25 ohms per square, but other resistivities can be achieved by varying the doping parameters and/or resin selection(s).

The conductive loaded resin-based materials comprise micron conductive powders, micron conductive fibers, or any combination thereof, which are substantially homogenized together within the base resin, during the molding process, yielding an easy to produce low cost, electrically conductive, close tolerance manufactured part or circuit. The resulting molded article comprises a three dimensional, continuous network of conductive loading and polymer matrix. Exemplary micron conductive powders include carbons, graphites, amines or the like, and/or of metal powders such as nickel, copper, silver, aluminum, nichrome, or plated or the like. The use of carbons or other forms of powders such as graphite(s) etc. can create additional low level electron exchange and, when used in combination with micron conductive fibers, creates a micron filler element within the micron conductive network of fiber(s) producing further electrical conductivity as well as acting as a lubricant for the molding equipment. Carbon nano-tubes may be added to the conductive loaded resin-based material. The addition of conductive powder to the micron conductive fiber loading may increase the surface conductivity of the molded part, particularly in areas where a skinning effect occurs during molding.

The micron conductive fibers may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, nichrome fiber, or the like, or combinations thereof. Exemplary metal plating materials include, but are not limited to, copper, nickel, cobalt, silver, gold, palladium, platinum, ruthenium, rhodium, and nichrome, and alloys of thereof. Any platable fiber may be used as the core for a non-metal fiber. Exemplary non-metal fibers include, but are not limited to, carbon, graphite, polyester, basalt, melamine, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

Where micron fiber is combined with base resin, the micron fiber may be pretreated to improve performance. According to one embodiment of the present invention, the fibers are subjected to any or several chemical modifications in order to improve the fibers interfacial properties. Fiber modification processes include, but are not limited to: mercerization; peroxide treatment; benzoylation; and amino, silane or other chemical or polymer treatments. The fiber modification processes are useful for improved the interfacial adhesion, improved wetting during homogenization and/or reduced oxide growth when compared to non-treated fiber.

The structural material may be any polymer resin or combination of polymer resins. Non-conductive resins or inherently conductive resins may be used as the structural material. Conjugated polymer resins, complex polymer resins, and/or inherently conductive resins may be used as the structural material. The dielectric properties of the resin-based material will have a direct effect upon the final electrical performance of the conductive loaded resin-based material. Many different dielectric properties are possible depending on the chemical makeup and/or arrangement, such as linking, cross-linking or the like, of the polymer, co-polymer, monomer, ter-polymer, or homo-polymer material. Structural material can be, here given as examples and not as an exhaustive list, polymer resins produced by GE PLASTICS, Pittsfield, Mass., a range of other plastics produced by GE PLASTICS, Pittsfield, Mass., a range of other plastics produced by other manufacturers, silicones produced by GE SILICONES, Waterford, N.Y., or other flexible resin-based rubber compounds produced by other manufacturers.

The resin-based structural material loaded with micron conductive powders, micron conductive fibers, or in combination thereof can be molded, using conventional molding methods such as injection molding or over-molding, or extrusion, or compression molding, or calendaring, to create desired shapes and sizes. The molded conductive loaded resin-based materials can also be stamped, cut or milled as desired to form create the desired shape form factor(s) of the articles. The doping composition and directionality associated with the micron conductors within the loaded base resins can affect the electrical and structural characteristics of the electrical connectivity for railway systems and can be precisely controlled by mold designs, gating and or protrusion design(s) and or during the molding process itself. In addition, the resin base can be selected to obtain the desired thermal characteristics such as very high melting point or specific thermal conductivity.

A resin-based sandwich laminate could also be fabricated with random or continuous webbed micron stainless steel fibers or other conductive fibers, forming a cloth like material. The webbed conductive fiber can be laminated or the like to materials such as Teflon, Polyesters, or any resin-based flexible or solid material(s), which when discretely designed in fiber content(s), orientation(s) and shape(s), will produce a very highly conductive flexible cloth-like material. Such a cloth-like material could also be used in forming articles that could be embedded in a person's clothing as well as other resin materials such as rubber(s) or plastic(s). When using conductive fibers as a webbed conductor as part of a laminate or cloth-like material, the fibers may have diameters of between about 3 and 12 microns, typically between about 8 and 12 microns or in the range of about 10 microns, with length(s) that can be seamless or overlapping.

The conductive loaded resin-based material may also be formed into a prepreg laminate, cloth, or webbing. A laminate, cloth, or webbing of the conductive loaded resin-based material is first impregnated with a resin-based material. In various embodiments, the conductive loaded resin-based material is dipped, coated, sprayed, and/or extruded with resin-based material to cause the laminate, cloth, or webbing to adhere together in a prepreg grouping that is easy to handle. This prepreg is placed, or laid up, onto a form and is then heated to form a permanent bond. In another embodiment, the prepreg is laid up onto the impregnating resin while the resin is still wet and is then cured by heating or other means. In another embodiment, the wet lay-up is performed by laminating the conductive loaded resin-based prepreg over a honeycomb structure. In yet another embodiment, a wet prepreg is formed by spraying, dipping, or coating the conductive loaded resin-based material laminate, cloth, or webbing in high temperature capable paint.

Carbon fiber and resin-based composites are found to display unpredictable points of failure. In carbon fiber systems there is no elongation of the structure. By comparison, in the present invention, the conductive loaded resin-based material displays greater strength in the direction of elongation. As a result a structure formed of the conductive loaded resin-based material of the present invention will hold together even if crushed while a comparable carbon fiber composite will break into pieces.

The conductive loaded resin-based material of the present invention can be made resistant to corrosion and/or metal electrolysis by selecting micron conductive fiber and/or micron conductive powder and base resin that are resistant to corrosion and/or metal electrolysis. For example, if a corrosion/electrolysis resistant base resin is combined with stainless steel fiber and carbon fiber/powder, then a corrosion and/or metal electrolysis resistant conductive loaded resin-based material is achieved. Another additional and important feature of the present invention is that the conductive loaded resin-based material of the present invention may be made flame retardant. Selection of a flame-retardant (FR) base resin material allows the resulting product to exhibit flame retardant capability. This is especially important in applications as described herein.

The substantially homogeneous mixing of micron conductive fiber and/or micron conductive powder and base resin described in the present invention may also be described as doping. That is, the substantially homogeneous mixing converts the typically non-conductive base resin material into a conductive material. This process is analogous to the doping process whereby a semiconductor material, such as silicon, can be converted into a conductive material through the introduction of donor/acceptor ions as is well known in the art of semiconductor devices. Therefore, the present invention uses the term doping to mean converting a typically non-conductive base resin material into a conductive material through the substantially homogeneous mixing of micron conductive fiber and/or micron conductive powder into a base resin.

As an additional and important feature of the present invention, the molded conductor loaded resin-based material exhibits excellent thermal dissipation characteristics. Therefore, electrical connectivity for railway systems manufactured from the molded conductor loaded resin-based material can provide added thermal dissipation capabilities to the application. For example, heat can be dissipated from electrical devices physically and/or electrically connected to an article of the present invention.

As a significant advantage of the present invention, electrical connectivity for railway systems constructed of the conductive loaded resin-based material can be easily interfaced to an electrical circuit or grounded. In one embodiment, a wire can be attached to a conductive loaded resin-based conductor via a screw that is fastened to the conductor. For example, a simple sheet-metal type, self tapping screw, when fastened to the material, can achieve excellent electrical connectivity via the conductive matrix of the conductive loaded resin-based material. To facilitate this approach a boss may be molded into the conductive loaded resin-based material to accommodate such a screw. Alternatively, if a solderable screw material, such as copper, is used, then a wire can be soldered to the screw that is embedded into the conductive loaded resin-based material. In another embodiment, the conductive loaded resin-based material is partly or completely plated with a metal layer. The metal layer forms excellent electrical conductivity with the conductive matrix. A connection of this metal layer to another circuit or to ground is then made. For example, if the metal layer is solderable, then a soldered connection may be made between the conductor and a grounding wire.

Where a metal layer is formed over the surface of the conductive loaded resin-based material, any of several techniques may be used to form this metal layer. This metal layer may be used for visual enhancement of the molded conductive loaded resin-based material article or to otherwise alter performance properties. Well-known techniques, such as electroless metal plating, electro plating, electrolytic metal plating, sputtering, metal vapor deposition, metallic painting, or the like, may be applied to the formation of this metal layer. If metal plating is used, then the resin-based structural material of the conductive loaded, resin-based material is one that can be metal plated. There are many of the polymer resins that can be plated with metal layers. For example, GE Plastics, SUPEC, VALOX, ULTEM, CYCOLAC, UGIKRAL, STYRON, CYCOLOY are a few resin-based materials that can be metal plated. Electroless plating is typically a multiple-stage chemical process where, for example, a thin copper layer is first deposited to form a conductive layer. This conductive layer is then used as an electrode for the subsequent plating of a thicker metal layer.

A typical metal deposition process for forming a metal layer onto the conductive loaded resin-based material is vacuum metallization. Vacuum metallization is the process where a metal layer, such as aluminum, is deposited on the conductive loaded resin-based material inside a vacuum chamber. In a metallic painting process, metal particles, such as silver, copper, or nickel, or the like, are dispersed in an acrylic, vinyl, epoxy, or urethane binder. Most resin-based materials accept and hold paint well, and automatic spraying systems apply coating with consistency. In addition, the excellent conductivity of the conductive loaded resin-based material of the present invention facilitates the use of extremely efficient, electrostatic painting techniques.

The conductive loaded resin-based material can be contacted in any of several ways. In one embodiment, a pin is embedded into the conductive loaded resin-based material by insert molding, ultrasonic welding, pressing, or other means. A connection with a metal wire can easily be made to this pin and results in excellent contact to the conductive loaded resin-based material. In another embodiment, a hole is formed in to the conductive loaded resin-based material either during the molding process or by a subsequent process step such as drilling, punching, or the like. A pin is then placed into the hole and is then ultrasonically welded to form a permanent mechanical and electrical contact. In yet another embodiment, a pin or a wire is soldered to the conductive loaded resin-based material. In this case, a hole is formed in the conductive loaded resin-based material either during the molding operation or by drilling, stamping, punching, or the like. A solderable layer is then formed in the hole. The solderable layer is preferably formed by metal plating. A conductor is placed into the hole and then mechanically and electrically bonded by point, wave, or reflow soldering.

Another method to provide connectivity to the conductive loaded resin-based material is through the application of a solderable ink film to the surface. One exemplary solderable ink is a combination of copper and solder particles in an epoxy resin binder. The resulting mixture is an active, screen-printable and dispensable material. During curing, the solder reflows to coat and to connect the copper particles and to thereby form a cured surface that is directly solderable without the need for additional plating or other processing steps. Any solderable material may then be mechanically and/or electrically attached, via soldering, to the conductive loaded resin-based material at the location of the applied solderable ink. Many other types of solderable inks can be used to provide this solderable surface onto the conductive loaded resin-based material of the present invention. Another exemplary embodiment of a solderable ink is a mixture of one or more metal powder systems with a reactive organic medium. This type of ink material is converted to solderable pure metal during a low temperature cure without any organic binders or alloying elements.

A ferromagnetic conductive loaded resin-based material may be formed of the present invention to create a magnetic or magnetizable form of the material. Ferromagnetic micron conductive fibers and/or ferromagnetic conductive powders are mixed with the base resin. Ferrite materials and/or rare earth magnetic materials are added as a conductive loading to the base resin. With the substantially homogeneous mixing of the ferromagnetic micron conductive fibers and/or micron conductive powders, the ferromagnetic conductive loaded resin-based material is able to produce an excellent low cost, low weight magnetize-able item. The magnets and magnetic devices of the present invention can be magnetized during or after the molding process. The magnetic strength of the magnets and magnetic devices can be varied by adjusting the amount of ferromagnetic micron conductive fibers and/or ferromagnetic micron conductive powders that are incorporated with the base resin. By increasing the amount of the ferromagnetic doping, the strength of the magnet or magnetic devices is increased. The substantially homogenous mixing of the conductive fiber network allows for a substantial amount of fiber to be added to the base resin without causing the structural integrity of the item to decline. The ferromagnetic conductive loaded resin-based magnets display the excellent physical properties of the base resin, including flexibility, moldability, strength, and resistance to environmental corrosion, along with excellent magnetic ability. In addition, the unique ferromagnetic conductive loaded resin-based material facilitates formation of items that exhibit excellent thermal and electrical conductivity as well as magnetism.

A high aspect ratio magnet is easily achieved through the use of ferromagnetic conductive micron fiber or through the combination of ferromagnetic micron powder with conductive micron fiber. The use of micron conductive fiber allows for molding articles with a high aspect ratio of conductive fiber to cross sectional area. If a ferromagnetic micron fiber is used, then this high aspect ratio translates into a high quality magnetic article. Alternatively, if a ferromagnetic micron powder is combined with micron conductive fiber, then the magnetic effect of the powder is effectively spread throughout the molded article via the network of conductive fiber such that an effective high aspect ratio molded magnetic article is achieved. The ferromagnetic conductive loaded resin-based material may be magnetized, after molding, by exposing the molded article to a strong magnetic field. Alternatively, a strong magnetic field may be used to magnetize the ferromagnetic conductive loaded resin-based material during the molding process.

The ferromagnetic conductive loading is in the form of fiber, powder, or a combination of fiber and powder. The micron conductive powder may be metal fiber or metal plated fiber. If metal plated fiber is used, then the core fiber is a platable material and may be metal or non-metal. Exemplary ferromagnetic conductive fiber materials include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive fiber materials. Exemplary ferromagnetic micron powder leached onto the conductive fibers include ferrite, or ceramic, materials as nickel zinc, manganese zinc, and combinations of iron, boron, and strontium, and the like. In addition, rare earth elements, such as neodymium and samarium, typified by neodymium-iron-boron, samarium-cobalt, and the like, are useful ferromagnetic conductive powder materials. A ferromagnetic conductive loading may be combined with a non-ferromagnetic conductive loading to form a conductive loaded resin-based material that combines excellent conductive qualities with magnetic capabilities.

Referring now to FIG. 1, a first preferred embodiment of the present invention is illustrated. An electrical passenger train system is shown. The system comprises an electrically powered train 20. The train 20 is powered by an electric motor 13 that is fixably mounted within the train chassis. An electric power source 17 provides energy to power the train motor 13. However, due to the necessary utility of the railway system, the power source 17 is physically separated from the train 20 such that an electrical connectivity apparatus must be provided to electrically connect the power source 17 to the train 20. The electrical connectivity, in this embodiment, is an overhead power system 16, 21, 23, 24, and 25. Overhead power systems are particularly useful for alternating current (AC) powered trains but can also be used for direct current (DC) systems. AC systems typically use very large voltages to reduce $I^2R$ losses in the distribution lines. The overhead power system allows the power wires 16 to be spaced sufficiently above the train and away from other ground objects to prevent high voltage discharge.

The train 20 is equipped with electrical coupling devices, called pantographs 12 and 14. The pantographs 12 and 14 conduct electrical power from the overhead wires 16 into the train 20. The pantographs 12 and 14 are forced upward from the train such that the connection surfaces 12 are maintained in contact with the overhead wires 16. The pantographs have a contact surface 12 attached to an extendible arm 14. The pantographs can be raised to contact the overhead wire 16 or lowered to break the contact. In one preferred embodiment, the contact bars 12 of the pantographs comprise the conductive loaded resin-based material of the present invention. In another preferred embodiment, the mechanical arms 14 of the pantographs comprise the conductive loaded resin-based material of the present invention. In another preferred embodiment, both contact bars 12 and the mechanical arms 14 comprise the conductive loaded resin-based material. According to one embodiment, the pantograph is formed by injection molding the contact bar 12 and/or mechanical arms 14 from the conductive loaded resin-based material. In another embodiment, the contact bar 12 and/or mechanical arms 14 are extruded from the conductive loaded resin-based material. The resulting pantograph device exhibits excellent conductivity with low $I^2R$ loss and excellent resistance to oxidation and corrosion. The pantograph device may have any geometric shape.

As one embodiment of the present invention, the overhead power system comprises mechanical supports 21 and 25 and a catenary structure comprising contact wire 16, catenary support 23, and dropper wires 24. As the passenger train 20 passes under the overhead power system, the pantograph's contacts 12 push against the contact wire 16 to conduct electric current. The purpose of the catenary wiring structure 24 is to maintain the contact wire 16 in a level and taunt position relative to the train track 22. According to one embodiment of the present invention, the contact wire 16 comprises the conductive loaded resin-based material of the present invention. According to other embodiments of the present invention, the catenary cable 23 and/or dropper line 24 comprise the conductive loaded resin-based material. The catenary components 16, 23, and 24 are preferably formed by extruding the conductive loaded, resin-based material. The resulting catenary structure 16, 23, and 24 exhibits excellent conductivity with low $I^2R$ loss and excellent resistance to oxidation and corrosion.

Figure 8:
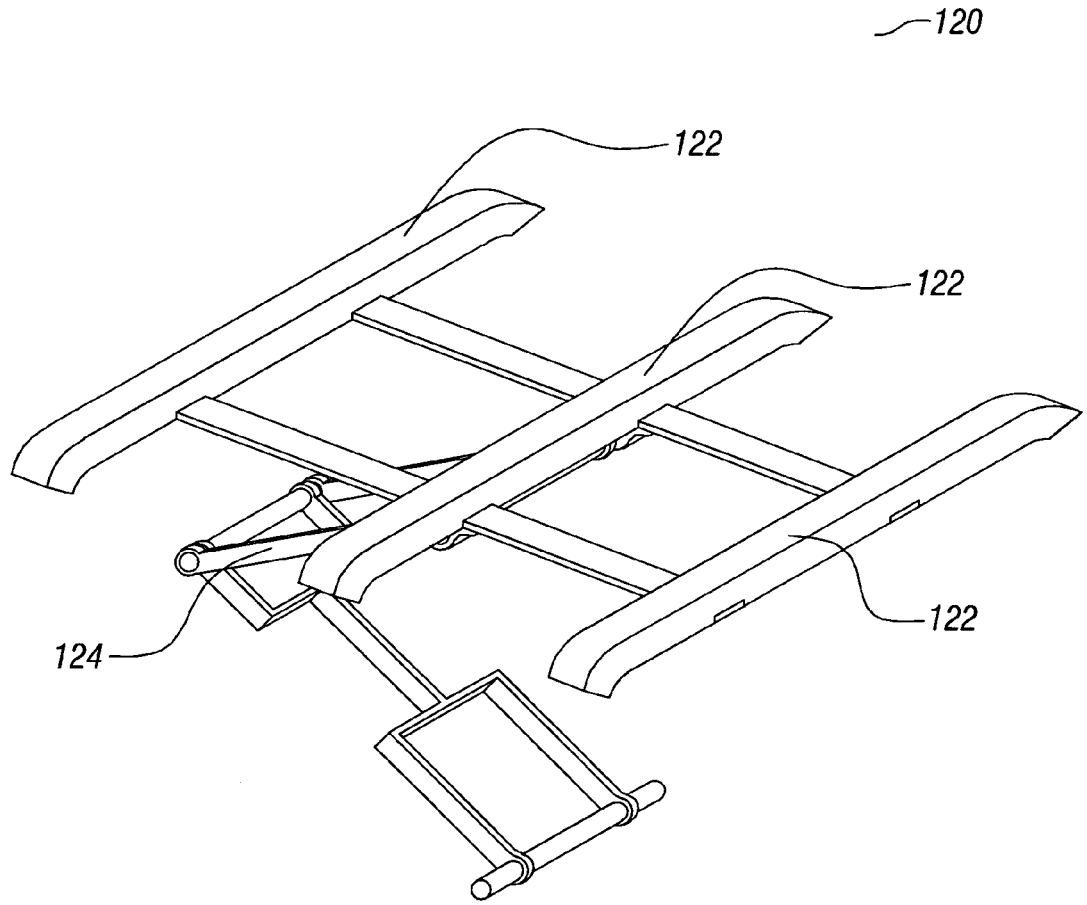
FIG. 8 illustrates a third preferred embodiment of the present invention showing a pantograph formed of conductive loaded resin-based material according to the present invention.

Referring now to FIG. 8, a third preferred embodiment of the present invention is illustrated. A top view of one embodiment of a pantograph 120 is illustrated. The pantograph 120 is supported by the pantograph arm structure 124 and mounted on top of the train car as shown in FIG. 1. Referring again to FIG. 8, the pantograph 120 has a collector plate 122 that serves as the contact point between the catenary contact wire and the train. The pantograph arms 124 are spring loaded so that a constant electrical connection can be maintained. The collector plate 122 and/or the structural arms comprise the conductive loaded resin-based material of the present invention.

Figure 12:
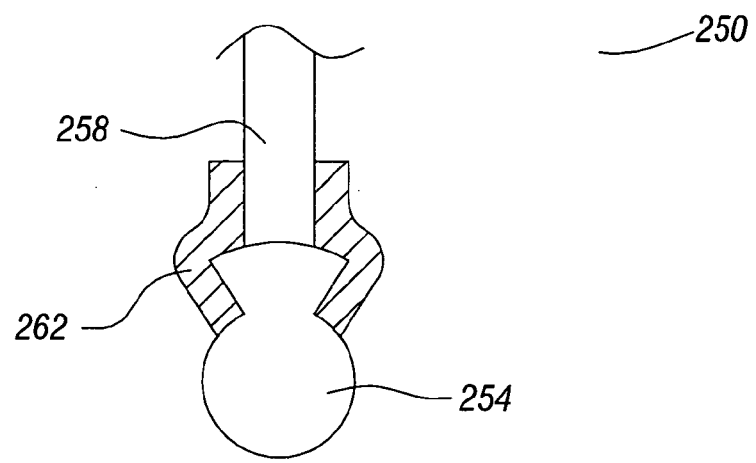
FIG. 12 illustrates a seventh preferred embodiment of the present invention showing an embodiment of a contact wire for an overhead electrical connectivity formed of conductive loaded resin-based material according to the present invention.

Referring now to FIG. 12, a seventh preferred embodiment of the present invention is illustrated. An embodiment 250 of a catenary contact wire 254 and dropper wire 258 coupling is illustrated in cross section. As described above, the contact wire 254 is used to conduct the operating current for an overhead power system as shown in FIG. 1. The dropper wire 258 is used to connect the contact wire 254 to the catenary structure. Referring again to FIG. 12, the dropper wire 258 is connected to the contact wire 254, according to this embodiment, by a connecting clamp 262. According to this embodiment, any, or all, of the contact wire 254, the dropper wire 258, and the clamp 262 comprise the conductive loaded resin-based material of the present invention.

Referring again to FIG. 1, by forming various electrical contacting structures, such as the pantograph 12 and 14 and the catenary system 23, 24, and 16, from the conductive loaded resin-based material of the present invention several advantages are derived. The conductive loaded resin-based material can be formulated to be non-corrosive by selecting non-corrosive conductive material and non-reactive resin. Alternatively, a non-corrosive coating may be formed over the conductive material. Non-corrosive performance of the pantograph and catenary system is a significant advantage over prior art, metal-based systems where corrosion presents significant maintenance and performance issues. In addition, the electrical contacting structures of these embodiments are lighter than comparable metal counterparts. The electrical contacting structures can be manufactured using straightforward molding techniques, such as injection molding and extrusion.

Referring now to FIGS. 7, 9, 10, 11, and 14, other preferred embodiments of the preferred invention are illustrated. In particular, $3^{rd}$ rail and $4^{th}$ rail power systems are illustrated. In a prior art $3^{rd}$ rail or $4^{th}$ rail system, the electrical power is coupled to the electric train via one or two additional metal rails positioned in the track bed rather than via the overhead power lines. Third and fourth rail systems are used primarily for DC systems where the voltage levels are sufficiently low (perhaps 600 Volts) to permit safe operation with limited distances between the power rails and nearby objects.

Figure 9:
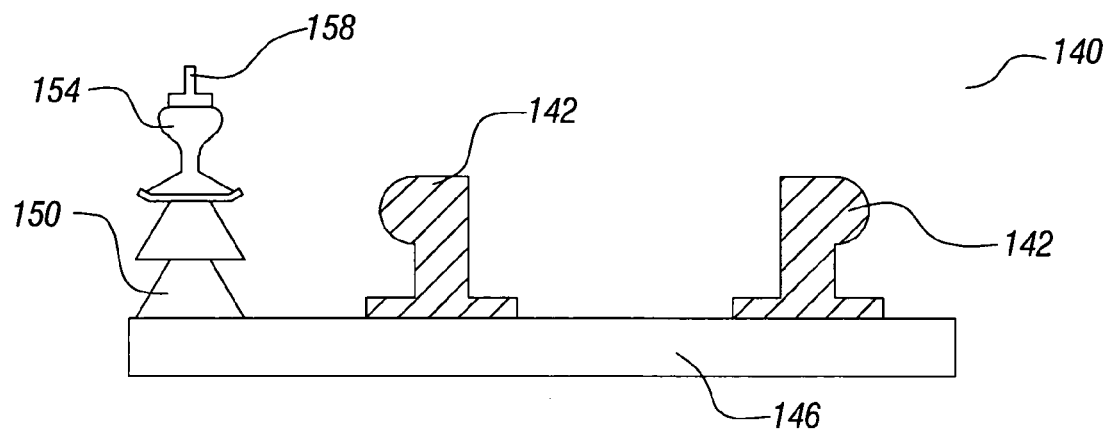
FIG. 9 illustrates a fourth preferred embodiment of the present invention showing a first embodiment of a third-rail system utilizing electrical connectivity formed of conductive loaded resin-based material according to the present invention.

Referring now to FIG. 9, an embodiment of a $3^{rd}$ rail system according to the present invention is illustrated. A side view of a $3^{rd}$ rail system 140 is shown. The $3^{rd}$ rail system 140 comprises a set of running rails 142 mounted on a wooden support beam that is typically called a sleeper 146. The running rails 142 support the train and are typically constructed of steel. The third rail 154 is likewise mounted in the track bed over the sleeper 146. The third rail is electrically isolated from the sleeper 146 by insulators 150. The third rail 154 supplies the electrical power to the train via a contacting device, called a slipper or a shoe 158, that slides along the surface of the rail 154. A conductive cable, not shown, connects the shoe 158 to the train. In the present invention, the third rail 154 and/or the shoe 158 comprises the conductive loaded resin-based material. More preferably, both the third rail 154 and the shoe 158 comprise the conductive loaded resin-based material.

A particular advantage of constructing the $3^{rd}$ rail 154 from the conductive loaded resin-based material is the elimination of rail corrosion. The traditional $3^{rd}$ rail system is formed of a metal, such as steel, that tends to require a great deal of maintenance in order to keep the conductive rail 154 free from corrosion, and able to supply electrical current to the trains, when the rail is exposed to the environment. The $3^{rd}$ rail system 140 of this present invention maintains an excellent low maintenance, non-corrosive electrical contact point for trains regardless of the environmental conditions.

Figure 10:
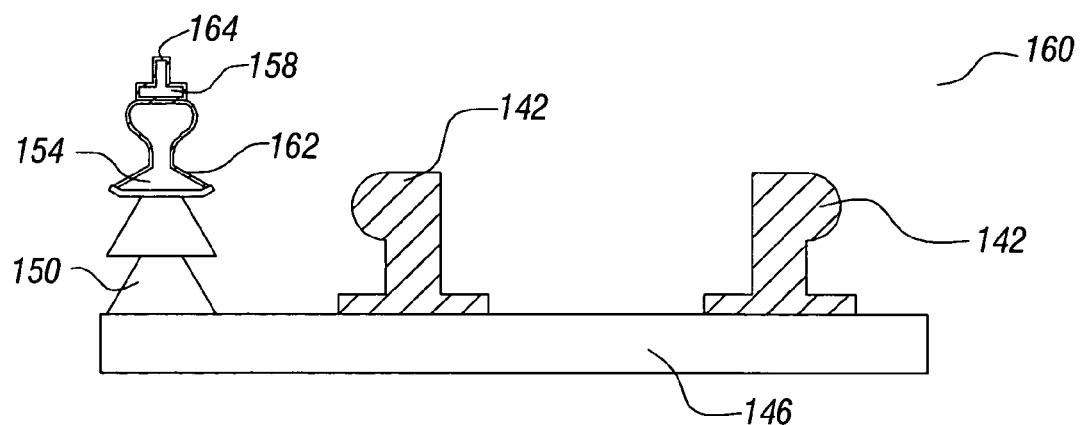
FIG. 10 illustrates a fifth preferred embodiment of the present invention showing a second embodiment of a third-rail system utilizing electrical connectivity formed of conductive loaded resin-based material according to the present invention.

Referring now to FIG. 10, another embodiment of the third rail power system 160 is shown. In this case, the conductive rail 154 and the shoe 164 are formed of the conductive loaded resin-based material of the present invention and, further, are have a metal layer 158 overlying the conductive loaded resin-based material.

Figure 11:
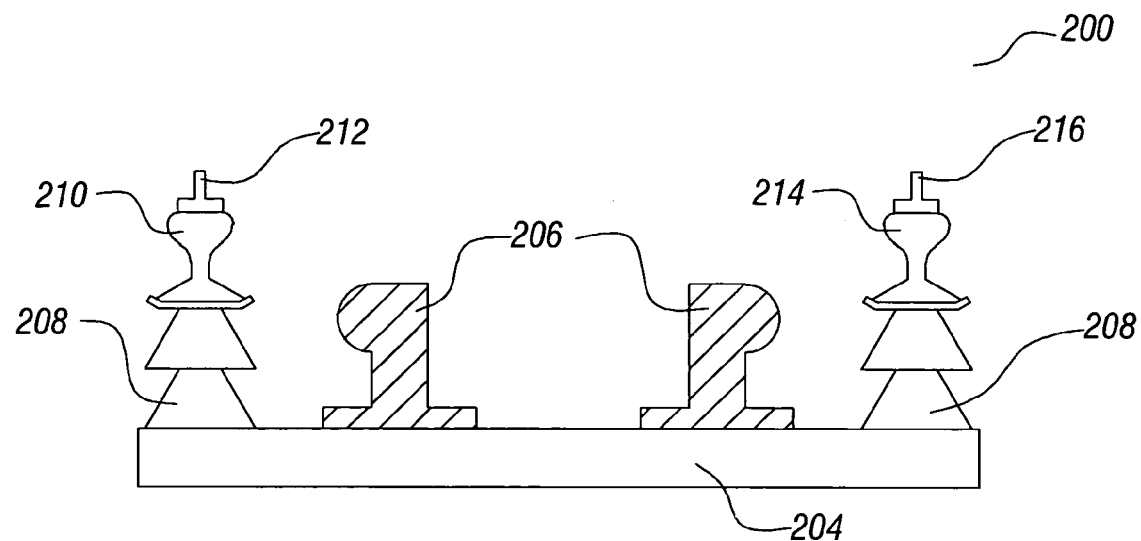
FIG. 11 illustrates a sixth preferred embodiment of the present invention showing a fourth-rail system utilizing electrical connectivity formed of conductive loaded resin-based material according to the present invention.

Referring now to FIG. 11, an embodiment 200 of a fourth rail power system is illustrated. In a $4^{th}$ rail system, positive and negative connections are provided for the power supply. By comparison, in the third rail system shown in FIGS. 9 and 10, the running rails 142 are used as ground return lines for the electrical current, whether DC or AC. Referring again to FIG. 11, two power rails 210 and 214 are provided along with the running rails 206 and sleepers 204. The power rails 210 and 214 allow for positive and negative DC terminals, such as +300 Volts and −300 Volts, to be used in the power system. In addition, the running rails 206 are not used as ground returns thus improving performance. The electrical rails 210 and 214 are again separated from the sleeper 204 by insulators 208. Separate shoes 212 and 216 are used to couple each rail 210 and 216 to the train. FIGS. 9 through 11 illustrate $3^{rd}$ and $4^{th}$ rail systems where the shoe contacts the rail on the top rail surface. These systems are therefore called top contact systems. The conductive rails are preferably formed by extruding the conductive loaded resin-based material.

Figure 7:
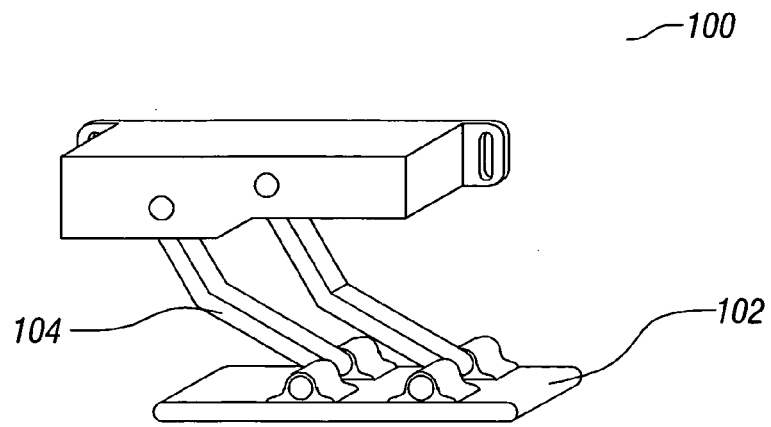
FIG. 7 illustrates a second preferred embodiment of the present invention showing a contact shoe for a third rail system formed in part of the conductive loaded resin-based material according to the present invention.

Referring now to FIG. 7, a $3^{rd}$ rail top contact collector shoe 100 is shown having the contact pad 102 formed of the conductive loaded resin-based material of the present invention and kept in place by the support arms 104. The use of many collector shoes 100 are needed to supply power to the engine in order to compensate for gaps in the $3^{rd}$ rail that at junction points or crossings with other lines. The collector shoes 100 are all connected to a common bus line. The collector shoe 100 shown is a top contact shoe, which means that the contact pad 102 rides along the top of the current rail. Two further embodiments of the present invention not shown, is a side contact shoe and a bottom contact shoe. The contact pad 102 formed of the conductive loaded resin-based material has the advantages of being non corrosive in the elements and a lower cost of manufacturing than a metal contact pad. The base resin selected for the contact pad 102 would be chosen from any number of wear resistant resins such as UHMW Teflon™ or Kevlar™ or other agents may be added to base resin to improved lubricity of the conductive loaded, resin-based material. In addition, while a top contact power system is illustrated, it is understood that the conductive loaded resin-based material of the present invention is also applicable to side contact and bottom contact $3^{rd}$ rail systems as well.

Figure 14:
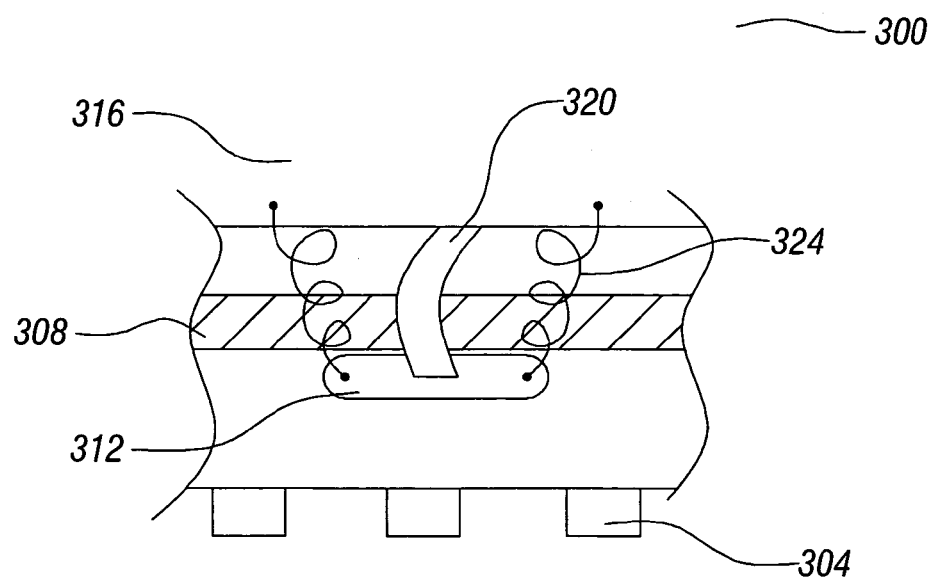
FIG. 14 illustrates a ninth preferred embodiment of the present invention showing an embodiment of a contact shoe for a third-rail system formed of conductive loaded resin-based material according to the present invention.

Referring now to FIG. 14, an embodiment of a bottom contact $3^{rd}$ rail system 300 is shown in side view. The $3^{rd}$ rail 308 is mounted above the sleepers 304. The third rail 308 comprises the conductive loaded resin-based material according to one embodiment. A bottom contact shoe 312 rides the bottom side of the rain 308 and is connected to the train 316 by a cable. The bottom contact shoe 312 comprises the conductive loaded resin-based material according to the present invention. Alternatively, the cable 320 comprises the conductive loaded resin-based material. The bottom contact shoe 312 is held against the bottom side of the rail 308 by spring loading 324.

Figure 13:
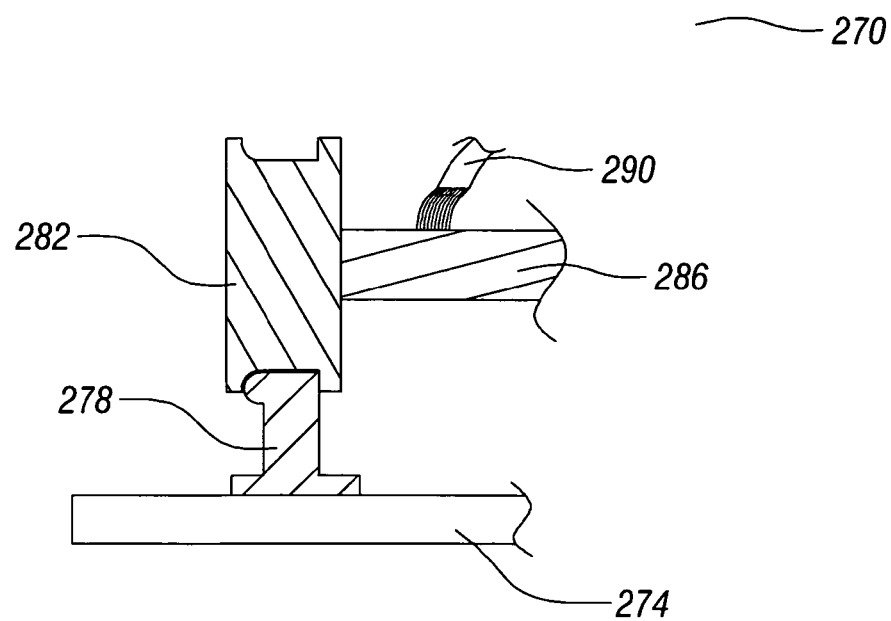
FIG. 13 illustrates an eighth preferred embodiment of the present invention showing an embodiment of a ground return system comprising conductive loaded resin-based material according to the present invention.

Referring now to FIG. 13, another embodiment of the present invention is illustrated. A ground return system 270 for an electric train is shown. In overhead systems or in $3^{rd}$ rail systems, a ground return path must be supplied. Typically, these systems use the running rails 278 as a ground return path. The running rails 278 typically comprise steel and are mounted onto the wood sleepers 274. The train wheels 282 and axles 286 also typically comprise steel or iron. In the present invention, ground circuit on the electric train is coupled to the axle 286 or wheel 282 using a brush formed of the conductive loaded resin-based material.

Figure 2:
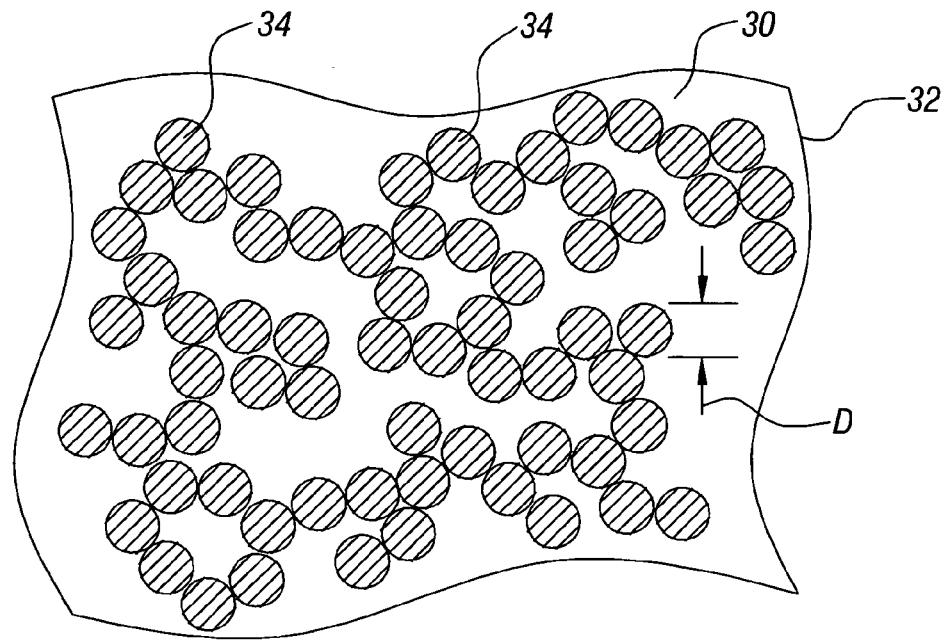
FIG. 2 illustrates a first preferred embodiment of a conductive loaded resin-based material wherein the conductive materials comprise a powder.

The conductive loaded resin-based material of the present invention typically comprises a micron powder(s) of conductor particles and/or in combination of micron fiber(s) substantially homogenized within a base resin host. FIG. 2 shows cross section view of an example of conductor loaded resin-based material 32 having powder of conductor particles 34 in a base resin host 30. In this example the diameter D of the conductor particles 34 in the powder is between about 3 and 12 microns.

Figure 3:
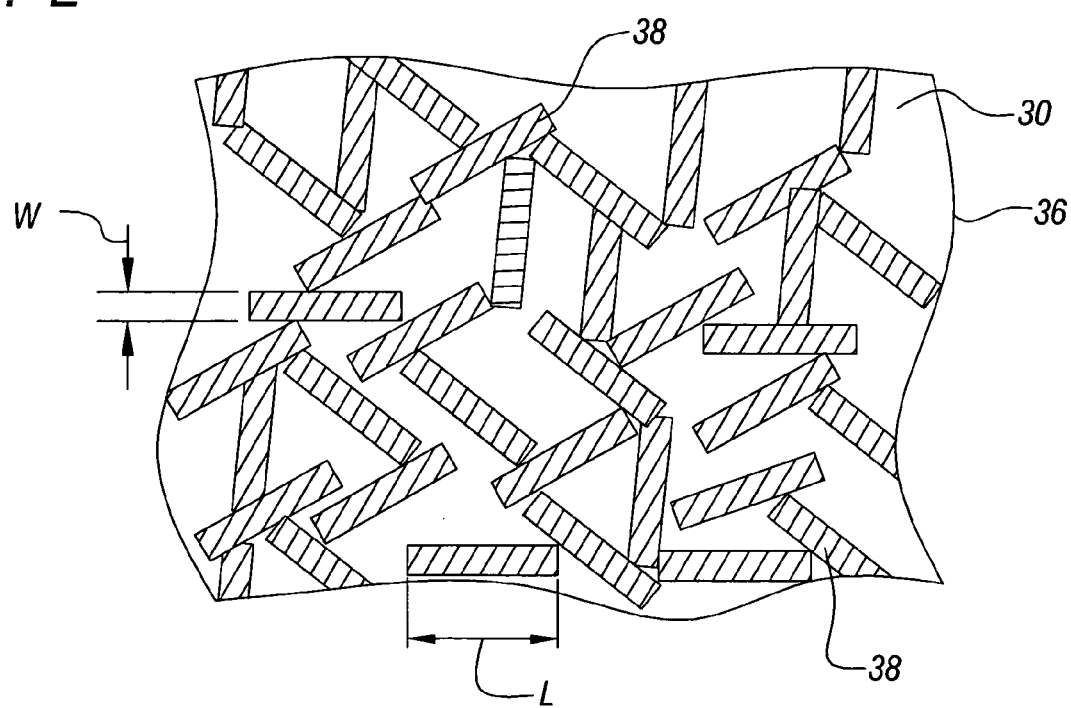
FIG. 3 illustrates a second preferred embodiment of a conductive loaded resin-based material wherein the conductive materials comprise micron conductive fibers.

FIG. 3 shows a cross section view of an example of conductor loaded resin-based material 36 having conductor fibers 38 in a base resin host 30. The conductor fibers 38 have a diameter of between about 3 and 12 microns, typically in the range of 10 microns or between about 8 and 12 microns, and a length of between about 2 and 14 millimeters. The micron conductive fibers 38 may be metal fiber or metal plated fiber. Further, the metal plated fiber may be formed by plating metal onto a metal fiber or by plating metal onto a non-metal fiber. Exemplary metal fibers include, but are not limited to, stainless steel fiber, copper fiber, nickel fiber, silver fiber, aluminum fiber, nichrome fiber, or the like, or combinations thereof. Exemplary metal plating materials include, but are not limited to, copper, nickel, cobalt, silver, gold, palladium, platinum, ruthenium, rhodium, and nichrome, and alloys of thereof. Any platable fiber may be used as the core for a non-metal fiber. Exemplary non-metal fibers include, but are not limited to, carbon, graphite, polyester, basalt, man-made and naturally-occurring materials, and the like. In addition, superconductor metals, such as titanium, nickel, niobium, and zirconium, and alloys of titanium, nickel, niobium, and zirconium may also be used as micron conductive fibers and/or as metal plating onto fibers in the present invention.

These conductor particles and/or fibers are substantially homogenized within a base resin. As previously mentioned, the conductive loaded resin-based materials have a sheet resistance between about 5 and 25 ohms per square, though other values can be achieved by varying the doping parameters and/or resin selection. To realize this sheet resistance the weight of the conductor material comprises between about 20% and about 50% of the total weight of the conductive loaded resin-based material. More preferably, the weight of the conductive material comprises between about 20% and about 40% of the total weight of the conductive loaded resin-based material. More preferably yet, the weight of the conductive material comprises between about 25% and about 35% of the total weight of the conductive loaded resin-based material. Still more preferably yet, the weight of the conductive material comprises about 30% of the total weight of the conductive loaded resin-based material. Stainless Steel Fiber of 6-12 micron in diameter and lengths of 4-6 mm and comprising, by weight, about 30% of the total weight of the conductive loaded resin-based material will produce a very highly conductive parameter, efficient within any EMF, thermal, acoustic, or electronic spectrum.

In yet another preferred embodiment of the present invention, the doping of conductive loading is determined using a volume percentage. In a preferred embodiment, the conductive loading comprises a volume of between about 4% and about 10% of the total volume of the conductive loaded resin-based material.

Figure 4:
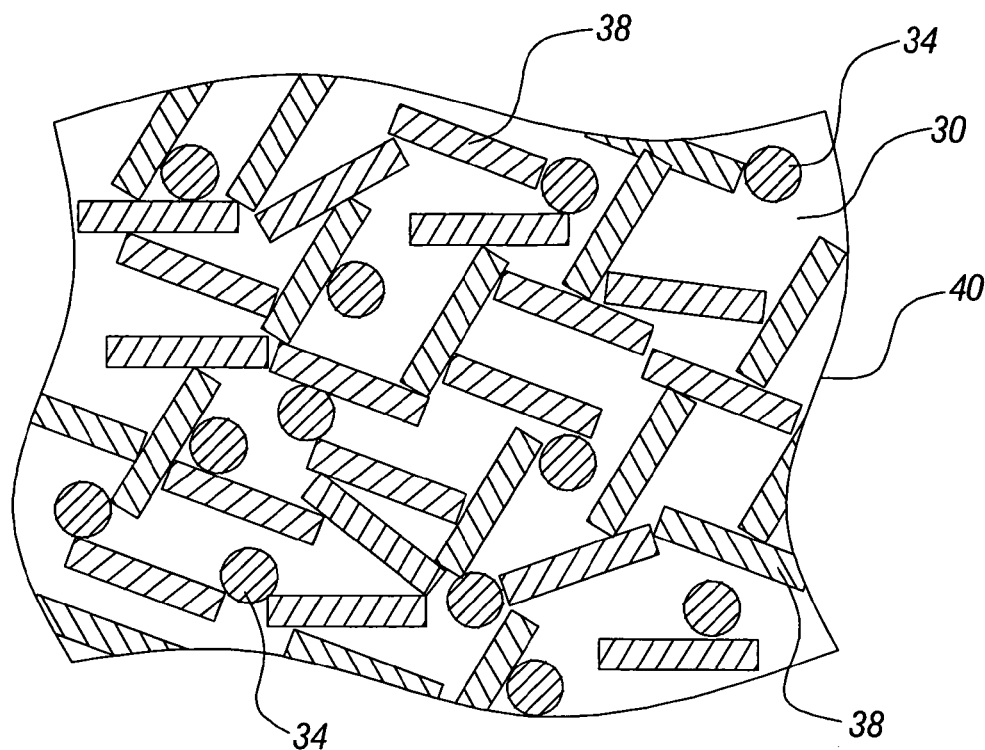
FIG. 4 illustrates a third preferred embodiment of a conductive loaded resin-based material wherein the conductive materials comprise both conductive powder and micron conductive fibers.

Referring now to FIG. 4, another preferred embodiment of the present invention is illustrated where the conductive materials comprise a combination of both conductive powders 34 and micron conductive fibers 38 substantially homogenized together within the resin base 30 during a molding process.

Figure 5A:
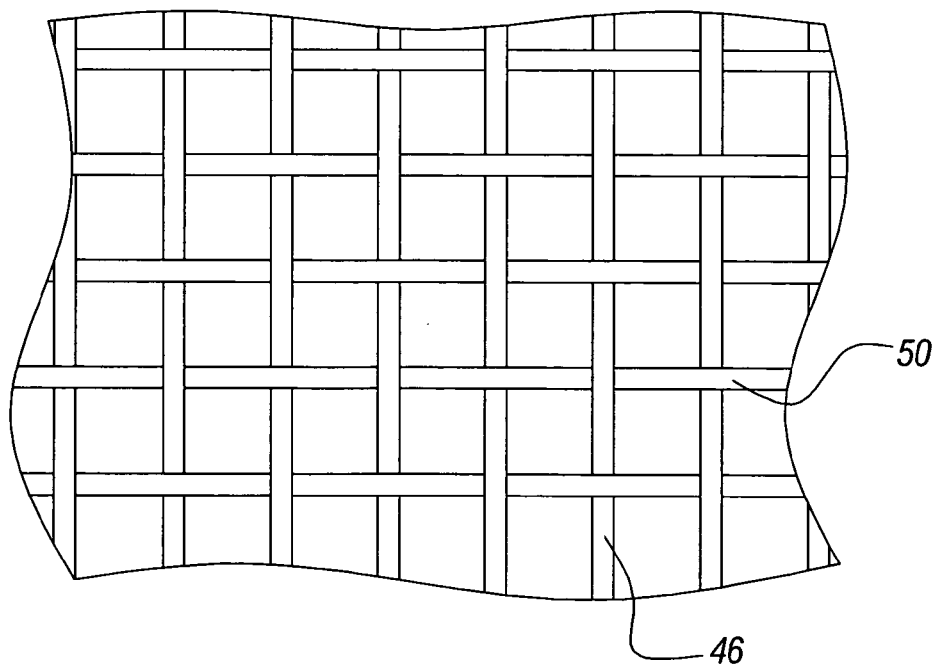

Referring now to FIGS. 5a and 5b, a preferred composition of the conductive loaded, resin-based material is illustrated. The conductive loaded resin-based material can be formed into fibers or textiles that are then woven or webbed into a conductive fabric. The conductive loaded resin-based material is formed in strands that can be woven as shown. FIG. 5a shows a conductive fabric 42 where the fibers are woven together in a two-dimensional weave 46 and 50 of fibers or textiles. FIG. 5b shows a conductive fabric 42' where the fibers are formed in a webbed arrangement. In the webbed arrangement, one or more continuous strands of the conductive fiber are nested in a random fashion. The resulting conductive fabrics or textiles 42, see FIG. 5a, and 42', see FIG. 5b, can be made very thin, thick, rigid, flexible or in solid form(s).

Similarly, a conductive, but cloth-like, material can be formed using woven or webbed micron stainless steel fibers, or other micron conductive fibers. These woven or webbed conductive cloths could also be sandwich laminated to one or more layers of materials such as Polyester(s), Teflon(s), Kevlar(s) or any other desired resin-based material(s). This conductive fabric may then be cut into desired shapes and sizes.

Electrical connectivity for railway systems formed from conductive loaded resin-based materials can be formed or molded in a number of different ways including injection molding, extrusion, calendaring, compression molding, thermoset molding, or chemically-induced molding or forming. FIG. 6a shows a simplified schematic diagram of an injection mold showing a lower portion 54 and upper portion 58 of the mold 50. Conductive loaded blended resin-based material is injected into the mold cavity 64 through an injection opening 60 and then the substantially homogenized conductive material cures by thermal reaction. The upper portion 58 and lower portion 54 of the mold are then separated or parted and the molded articles are removed.

FIG. 6b shows a simplified schematic diagram of an extruder 70 for forming electrical connectivity for railway systems using extrusion. Conductive loaded resin-based material(s) is placed in the hopper 80 of the extrusion unit 74. A piston, screw, press or other means 78 is then used to force the thermally molten, compression, thermoset, or a chemically induced curing conductive loaded resin-based material through an extrusion opening 82 which shapes the thermally molten curing or compression, thermoset, or chemically induced cured conductive loaded resin-based material to the desired shape. The conductive loaded resin-based material is then fully cured by chemical reaction or thermal reaction to a hardened or pliable state and is ready for use. Thermoplastic or thermosetting resin-based materials and associated processes may be used in molding the conductive loaded resin-based articles of the present invention.

The advantages of the present invention may now be summarized. An effective electrical power connectivity for an electrical railway system is achieved. The electrical railway power connectivity devices comprise a conductive loaded, resin-based material. Overhead electrical conductors, power rails, pantographs, and conductive shoes for an electrical railway system comprising conductive loaded resin-based material are achieved. A method to form electrical railway power connectivity devices from conductive loaded resin-based material is achieved. The electrical or thermal characteristics can be altered or the visual characteristics can be altered by forming a metal layer over the conductive loaded resin-based material.

As shown in the preferred embodiments, the novel methods and devices of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. An electric circuit apparatus comprising:
   an electric motor fixably mounted in a train;
   an electric power source physically separated from said train; and
   an electrical conductor electrically connecting said motor to said power source wherein said conductor comprises a conductive loaded, resin-based material comprising micron conductive fiber in a base resin host wherein the percent by weight of said micron conductive fiber is between 20% and 50% of the total weight of said conductive loaded resin-based material.

2. The apparatus according to claim 1 wherein the percent by volume of said micron conductive fiber is between about 4% and about 10% of the total volume of said conductive loaded resin-based material.

3. The apparatus according to claim 1 wherein said micron conductive fiber are metal.

4. The apparatus according to claim 1 wherein said micron conductive fiber is a non-conductive material with metal plating.

5. The apparatus according to claim 1 wherein said conductor comprises a cantenary device suspended over said train.

6. The apparatus according to claim 5 further comprising a pantograph device extending above said train to contact said catenary device wherein said pantograph device comprises said conductive loaded resin-based material.

7. The apparatus according to claim 1 wherein said conductor comprises a pantograph device extending above said train.

8. The apparatus according to claim 1 wherein said conductor comprises a conductive rail mounted on or near a train track.

9. The apparatus according to claim 8 further comprising a conductive shoe device extending from said train to contact said conductive rail wherein said conductive shoe device comprises said conductive loaded resin-based material.

10. The apparatus according to claim 1 wherein said conductor comprises a conductive shoe device extending from said train.

11. An electric circuit apparatus comprising:
    an electric motor fixably mounted in a train;
    an electric power source physically separated from said train; and
    an electrical conductor electrically connecting said motor to said power source wherein said conductor comprises a conductive loaded, resin-based material comprising micron conductive fiber in a base resin host.

12. The apparatus according to claim 11 wherein said micron fiber is nickel plated carbon micron fiber, stainless steel micron fiber, copper micron fiber, silver micron fiber or combinations thereof.

13. The apparatus according to claim 11 wherein said conductive loaded resin-based material further comprises micron conductive powder.

14. The apparatus according to claim 13 wherein said micron conductive powder is nickel, copper, or silver.

15. The apparatus according to claim 14 wherein said micron conductive powder is a non-metallic material with a metal plating.

16. The apparatus according to claim 11 wherein said conductive loaded resin-based material further comprises a ferromagnetic material.

17. The apparatus according to claim 11 wherein said conductor comprises a cantenary device suspended over said train.

18. The apparatus according to claim 17 further comprising a pantograph device extending above said train to contact said catenary device wherein said pantograph device comprises said conductive loaded resin-based material.

19. The apparatus according to claim 11 wherein said conductor comprises a pantograph device extending above said train.

20. The apparatus according to claim 11 wherein said conductor comprises a conductive rail mounted on or near a train track.

21. The apparatus according to claim 20 further comprising a conductive shoe device extending from said train to contact said conductive rail wherein said conductive shoe device comprises said conductive loaded resin-based material.

22. The apparatus according to claim 11 wherein said conductor comprises a conductive shoe device extending from said train.

23. A method to form an electric circuit apparatus, said method comprising:
    providing an electric motor fixably mounted in a train;
    providing an electric power source physically separated from said train;
    providing a conductive loaded, resin-based material comprising micron conductive fiber in a resin-based host;
    molding said conductive loaded, resin-based material into an electrical conductor;
    placing said electrical conductor to electrically connect said motor to said power source.

24. The method according to claim 23 wherein the percent by weight of said micron conductive fiber is between about 20% and about 50% of the total weight of said conductive loaded resin-based material.

25. The method according to claim 23 wherein the percent by volume of said micron conductive fiber is between about 4% and about 10% of the total volume of said conductive loaded resin-based material.

26. The method according to claim 23 wherein said step of molding comprises:
- injecting said conductive loaded, resin-based material into a mold;
- curing said conductive loaded, resin-based material; and
- removing said electrical conductor from said mold.

27. The method according to claim 23 wherein said step of molding comprises:
- loading said conductive loaded, resin-based material into a chamber;
- extruding said conductive loaded, resin-based material out of said chamber through a shaping outlet; and
- curing said conductive loaded, resin-based material to form said electrical conductor.

* * * * *